United States Patent
Takahashi et al.

(10) Patent No.: US 6,364,714 B2
(45) Date of Patent: Apr. 2, 2002

(54) FD-SHAPED ADAPTER USED FOR CARD-SHAPED MEMORY DEVICE HAVING COMPARATIVELY LARGE THICKNESS AND SOLIDLY-BUILT STRUCTURE

(75) Inventors: Makoto Takahashi, Obanazawa; Makoto Sato, Nishimurayama-gun, both of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/792,742

(22) Filed: Feb. 23, 2001

(30) Foreign Application Priority Data

Feb. 24, 2000 (JP) ........................................ 2000-047078

(51) Int. Cl.[7] .............................................. H01R 25/00
(52) U.S. Cl. ........................ 439/638; 439/945; 365/51; 710/62
(58) Field of Search ................................ 439/638, 945, 439/374; 365/51, 52, 54; 710/62; 235/492

(56) References Cited

U.S. PATENT DOCUMENTS

| | | | | |
|---|---|---|---|---|
| 6,002,605 A | * | 12/1999 | Iwasaki et al. | 365/51 |
| 6,015,093 A | * | 1/2000 | Barrett et al. | 235/492 |
| 6,089,459 A | * | 7/2000 | Eisele et al. | 235/492 |
| 6,189,055 B1 | * | 2/2001 | Eisele et al. | 710/62 |
| 6,264,506 B1 | * | 7/2001 | Yasufuku et al. | 439/638 |

* cited by examiner

*Primary Examiner*—Tulsidas Patel
(74) *Attorney, Agent, or Firm*—Frishauf, Holtz, Goodman, Langer & Chick, P.C.

(57) ABSTRACT

An FD-shaped adapter for a card-shaped memory device has a base case, an electric circuit portion, a top cover, and a bottom cover. The bottom cover has a plate-shape and is provided with a bottom plate, side plates upwardly extended from side edges of the bottom plate, and flanges outwardly extended from each top edge of the side plates. The bottom cover is attached on the base case so that the flanges are sandwiched between the upper surface of the base case and an inner surface of the top cover.

5 Claims, 2 Drawing Sheets

FD-SHAPED ADAPTER USED FOR CARD-SHAPED MEMORY DEVICE HAVING COMPARATIVELY LARGE THICKNESS AND SOLIDLY-BUILT STRUCTURE

BACKGROUND OF THE INVENTION

This invention relates to an FD-shaped adapter used for recording data delivered from an electric apparatus, such as a personal computer, to a card-shaped memory device and reproducing data from the card-shaped memory device to the personal computer through an FD drive (which may be abbreviated to "FDD"), in particular, to the FD-shaped adapter suitable for the card-shaped memory device having comparatively large thickness.

Such kind of the FD-shaped adapter has the same shape as a 3.5-inch (3.5") flexible or floppy disk (which may be abbreviated to an "FD"). The FD-shaped adapter is used as follows. The FD-shaped adapter contains the card-shaped memory device. The card-shaped memory device is removable from the FD-shaped adapter. The FD-shaped adapter is inserted into the FDD. The FD-shaped adapter records data delivered from the personal computer to the card-shaped memory device and reproduces data from the card-shaped memory device to the personal computer through the FDD.

Because the card-shaped memory devices called as a "Memory Stick", a "Smart Media", a "Multimedia Card" (all these are registered or no-registered trademark), and so on are small size and solid and are gradually increased in storage capacity year by year, the card-shaped memory device tends to be widely used for the electric apparatus such as a visual apparatus, an audio apparatus, or a data processing apparatus, in particular, for a mobile-use apparatus.

As an interface apparatus capable of interfacing between the card-shaped memory device and the personal computer provided with the FDD as the most popularized storage drive so as to record data to the card-shaped memory device and reproduce data from the card-shaped memory device by an easy operation such as that for the 3.5" FD, the FD-shaped adapter is known and used.

Each of the card-shaped memory devices such as Memory Stick, Smart Media, and Multimedia Card is standardized electrically and mechanically. In regard to the standard in thickness, Smart Media has a small thickness: 0.75 mm while Memory Stick and Multimedia Card have large thickness: 2.80 mm and 1.40 mm, respectively.

Because the FD-shaped adapter for the card-shaped memory device is used as like as the use of the FD as mentioned above, the FD-shaped adapter must have the same or the similar dimension as the FD. Therefore, the FD-shaped adapter is, for example, limited in thickness: 3.30 mm.

A base case, as a major part of a casing, of the FD-shaped adapter for Smart Media is generally formed by only a plate member made of resin.

On the other hand, a base case of the FD-shaped adapter for Memory Stick or Multimedia Card is made of resin but is provided with a hole portion bored between both sides of the base case. Shape and dimension of the hole portion corresponds to a shape and the dimension of Memory Stick or Multimedia Card. One side of the hole portion is covered with a metal plate member (sheet metal member) called as a bottom cover, that is, a part individual and different from the base case.

The reason why the base case of the FD-shaped adapter for Memory Stick or Multimedia Card is not formed by a resin plate member only as like as the base case of the FD-shaped adapter for Smart Media is described below. If the base case of the FD-shaped adapter for Memory Stick or Multimedia Card is formed by the resin plate only, the base case must has a resin region having very small thickness in order to contain the card-shaped memory device having comparatively large thickness (Memory Stick or Multimedia Card). It is difficult to form such small thickness resin region by an injection molding. Furthermore, even if the base case having such small thickness is made by the injection molding, the base case never withstands practical use and therefore must be damaged easily.

In the FD-shaped adapter for Memory Stick or Multimedia Card, the bottom cover has a plate shape and is attached to the base case by adhesive, double-sided adhesive tape, or welding.

However, the bottom cover attached by the adhesive, the double-sided adhesive tape, or the welding may be easily removed. If the bottom cover is removed, user of the FD-shaped adapter may be hurt because edges of the bottom cover are keen. Furthermore, the bottom cover is removed when the FD-shaped adapter is inserted in the FD drive, the FD drive may fail.

SUMMARY OF THE INVENTION

It is therefore an object of this invention to provide an FD-shaped adapter which is used for a card-shaped memory device having comparatively large thickness and which has solidly-built structure so that a bottom cover is hard to remove.

An FD-shaped adapter for a card-shaped memory device to which this invention is applicable is which has a 3.5-inch flexible disk (FD)-shape and which is used for a card-shaped memory device so that the card-shaped memory device is removably inserted therein, the FD-shaped adapter being inserted into a flexible disk drive (FDD) in order to record/reproduce data to/from the card-shaped memory device through the FDD. The FD-shaped adapter has a base case, an electric circuit portion, a top cover, and a bottom cover. The base case is made of resin and provided with a cut-out portion formed so as to boring through upper and lower surfaces of the base case. The electric circuit portion is mounted on the upper surface of the base case. The top cover is made of metal and covering the whole of the upper surface of the base case. The bottom cover is made of metal and covering the cut-out portion at the lower surface of the base case. The bottom cover has a plate-shape and is provided with a bottom plate, side plates upwardly extended from side edges of the bottom plate, and flanges outwardly extended from each top edge of the side plates. The bottom cover is attached on the base case so that the flanges are sandwiched between the upper surface of the base case and an inner surface of the top cover.

The other objects, features, and advantages of this invention will become clear as the following description proceeds.

DESCRIPTION OF THE PREFERRED EMBODIMENT

Now, description will be made with reference to the drawings about an FD-shaped adapter for a card-shaped memory device according to an embodiment of this invention.

Figure 1:
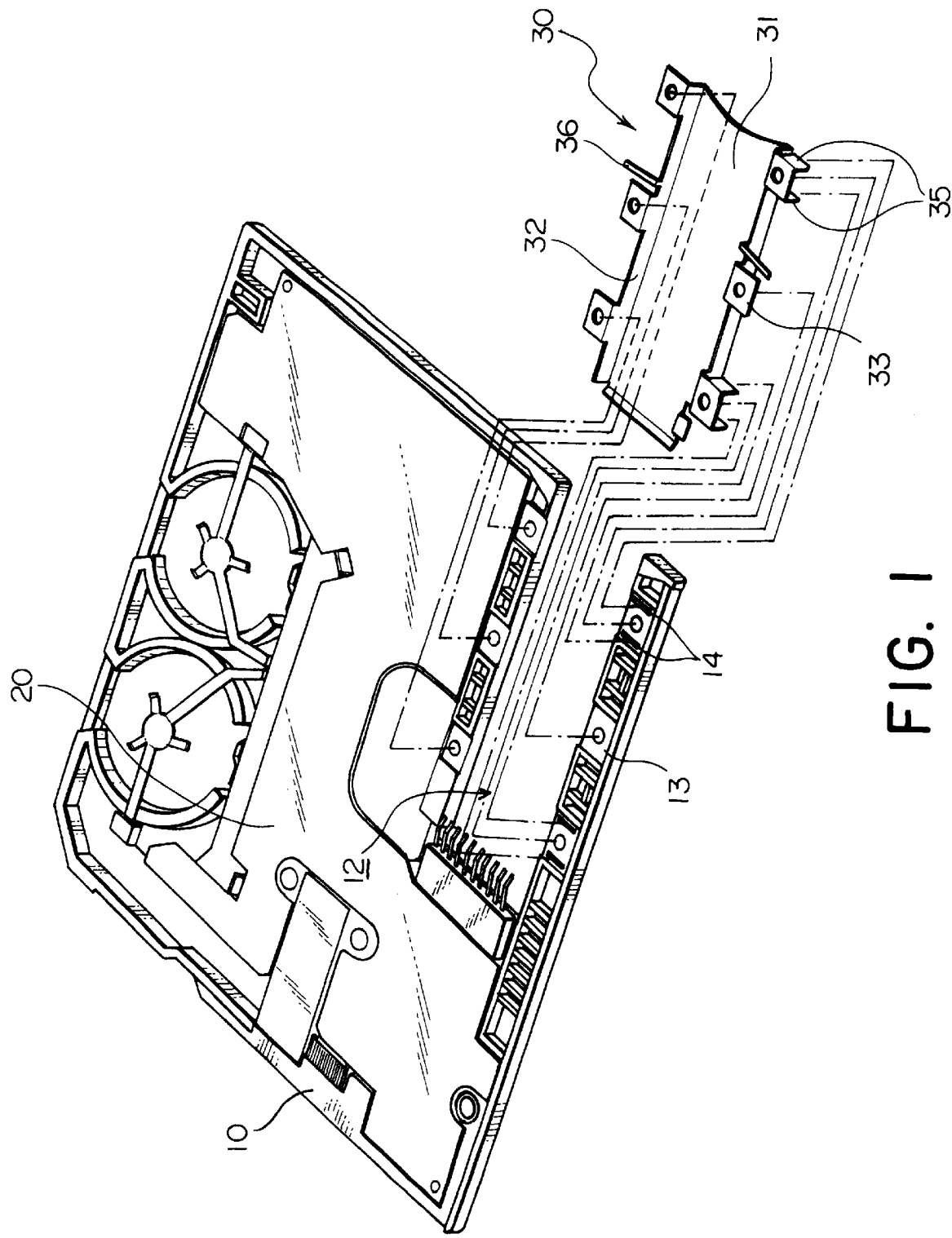
FIG. 1 is a perspective view showing subject parts of an FD-shaped adapter for a card-shaped memory device according to an embodiment of this invention.
Figure 2:
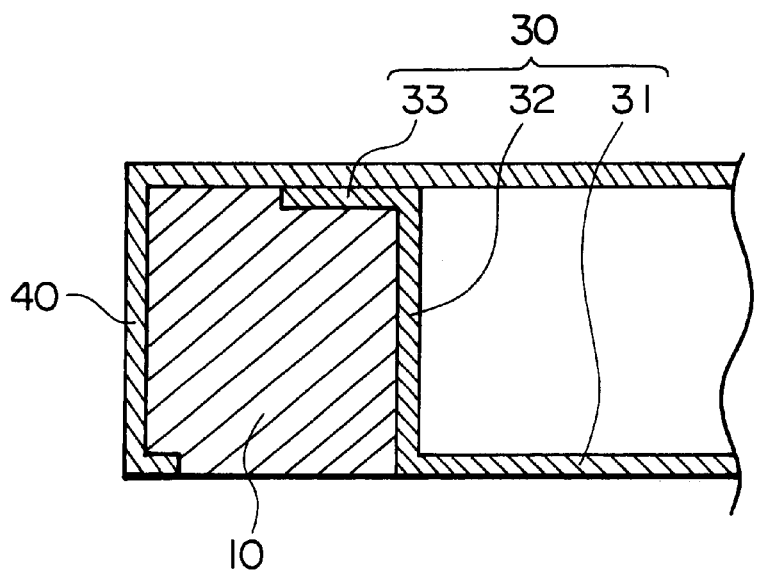
FIG. 2 is a cross sectional view partially showing the FD-shaped adapter for the card-shaped memory device according to the embodiment of this invention.

Referring to FIGS. 1 and 2, the FD-shaped adapter has an FD-shape and is used for Memory Stick (not shown) as the card-shaped memory device having comparatively large thickness so that the Memory Stick is removably inserted therein. The FD-shaped adapter is inserted into the FDD in order to record/reproduce data to/from the Memory Stick through the FDD (not shown), as like as the conventional FD-shaped adapter.

The FD-shaped adapter has a base case 10, an electric circuit portion 20, a top cover 40 (partially shown in FIG. 2 only), and a bottom cover 30. The base case 10 is made of resin and has a general FD-shape. The base case 10 is provided with a cut-out (hollow) portion 12 formed so as to boring through upper and lower surfaces of the base case 10. The electric circuit portion 20 is mounted onto the upper surface of the base case 10. The top cover 40 is made of metal and covers the whole of the upper surface of the base case 10. The bottom cover 30 is made of metal and covers the cut-out portion 12 at the lower surface of the base case.

The bottom cover 30 has a square plate-shape and is provided with a bottom plate 31, side plates 32 upwardly extended from side edges of the bottom plate 31, and flanges 33 outwardly extended from each top edge of the side plates 32.

The bottom cover 30 is attached onto the base case 10 so that the flanges 33 are sandwiched between the upper surface of the base case 10 and an inner surface of the top cover 40. Because the top cover 40 is rigidly attached to the base case 10 so as to hold the base case 10 therein as like as the conventional FD-shaped adapter, the top cover 40 never easily comes off from the base case 10 even if the top cover 40 is attached to the base case 10 by no-use of bolts.

Figure 3:
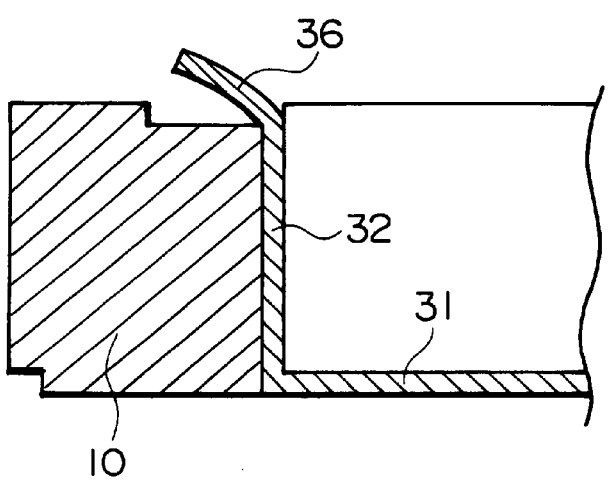
FIG. 3 is a cross sectional view partially showing the FD-shaped adapter for the card-shaped memory device according to the embodiment of this invention.

Referring to FIGS. 1 and 3, the bottom cover 30 is further provided with a spring piece 36 upwardly and outwardly extended from each top edge of the side plates 32. The bottom cover 30 is electrically connected with the top cover 40 (shown in FIG. 2) through the spring piece 36. Although it is not shown, the top cover 40 is electrically connected with an earth pattern of the electric circuit portion 20. The bottom cover 30 and the top cover 40 serve as an electric shield for electrically shielding the electric circuit portion 20 and the Memory Stick from static electricity and electric noise.

Figure 4A:
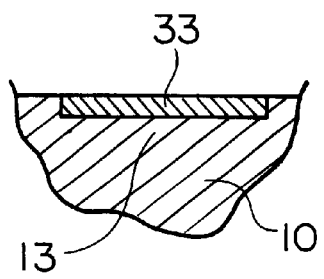
FIGS. 4A and 4B are cross sectional views partially showing the FD-shaped adapter for the card-shaped memory device according to the embodiment of this invention.
Figure 4B:
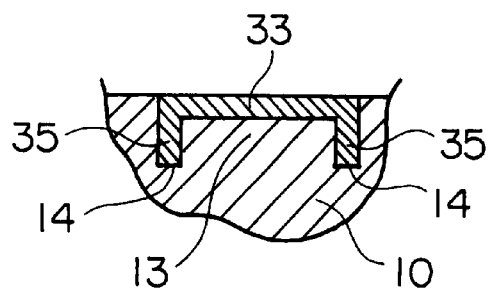

Referring to FIGS. 1, 4A, and 4B, the base case 10 is provided with dent portions 13 which are formed at a peripheral region of the cut-out portion 12 and which have locations and shapes corresponding to the flanges 33 of the bottom cover 30. The bottom cover 30 is positioned (limited locationally) and prevented from shifting or diverging in directions parallel to the lower surface of the base case 10 by a structure that the flanges 33 are engaged to the dent portions 13 even if the Memory Stick is inserted into/removed from the FD-shaped adapter.

Furthermore, the bottom cover 30 is further provided with blades 35 downwardly extended from a side edge of each of (two of, in this embodiment) the flanges 33. On the other hand, the base case 10 is further provided with slit portions 14 which are formed at the peripheral region of the cut-out portion 12 and which have locations and shapes corresponding to the blades 35 of the bottom cover 30. The bottom cover 30 is further positioned and prevented from diverging or shifting in the directions parallel to the lower surface of the base case 10 by a structure that the blades 35 are engaged to the slit portions 14.

The bottom cover 30 is attached to the base case 10 by a structure that the flanges 33 are attached to dent portions 13 of the base case 10 by adhesive, double-sided adhesive tape, or welding.

While this invention has thus far been described in conjunction with the embodiment thereof, it will readily be possible for those skilled in the art to put this invention into practice in various other manners. For example, the FD-shaped adapter according to this invention is not limited to the use for Memory Stick but may be the use for the other card-shaped memory device having comparatively large thickness such as Multimedia Card.

What is claimed is:

1. An FD-shaped adapter which has a 3.5-inch flexible disk (FD)-shape and which is used for a card-shaped memory device so that the card-shaped memory device is removably inserted therein, said FD-shaped adapter being inserted into a flexible disk drive (FDD) in order to record/reproduce data to/from the card-shaped memory device through the FDD, said FD-shaped adapter having a base case, an electric circuit portion, a top cover, and a bottom cover, said base case being made of resin and provided with a cut-out portion formed so as to boring through upper and lower surfaces of said base case, said electric circuit portion being mounted on said upper surface of said base case, said top cover being made of metal and covering the whole of said upper surface of said base case, said bottom cover being made of metal and covering said cut-out portion at said lower surface of said base case; wherein:

said bottom cover has a plate-shape and is provided with a bottom plate, side plates upwardly extended from side edges of said bottom plate, and flanges outwardly extended from each top edge of said side plates;

said bottom cover being attached on said base case so that said flanges are sandwiched between said upper surface of said base case and an inner surface of said top cover.

2. An FD-shaped adapter for a card-shaped memory device as claimed in claim 1; wherein:

said base case is provided with dent portions which are formed at a peripheral region of said cut-out portion and which have locations and shapes corresponding to said flanges of said bottom cover;

said bottom cover being positioned and prevented from diverging in directions parallel to said lower surface of said base case by a structure that said flanges are engaged to said dent portions.

3. An FD-shaped adapter for a card-shaped memory device as claimed in claim 1, wherein:

said bottom cover is further provided with a blade downwardly extended from a side edge of each of said flanges;

said base case being further provided with a slit portion which is formed at a peripheral region of said cut-out portion and which has location and shape corresponding to said blade of said bottom cover;

said bottom cover being positioned and prevented from diverging in directions parallel to said lower surface of said base case by a structure that said blade is engaged to said slit portion.

4. A flexible disk drive for driving an FD-shaped adapter for a card-shaped memory device claimed in claim 1, wherein:

said bottom cover is further provided with a spring piece upwardly and outwardly extended from each top edge of said side plates;

said bottom cover being electrically connected with said top cover through said spring piece;

said bottom and said top covers serving as an electric shield for electrically shielding said electric circuit portion and the card-shaped memory device from static electricity and electric noise.

5. A flexible disk drive as claimed in claim 1, wherein said bottom cover is attached to said base case by a structure that said flanges is attached to said upper surface of said base case by adhesive, double-sided adhesive tape, or welding.

* * * * *